(12) United States Patent
Tsao

(10) Patent No.: US 8,606,880 B2
(45) Date of Patent: Dec. 10, 2013

(54) USE OF WIRELESS DEVICES' EXTERNAL STORAGE

(75) Inventor: Sheng (Ted) Tai Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 2766 days.

(21) Appl. No.: 10/726,897

(22) Filed: Dec. 4, 2003

(65) Prior Publication Data
US 2010/0005153 A1    Jan. 7, 2010

(51) Int. Cl.
*G06F 15/16*    (2006.01)

(52) U.S. Cl.
USPC ........ 709/219; 709/203; 709/226; 455/412.1; 455/899

(58) Field of Classification Search
USPC ................. 709/200, 203, 217, 219, 226, 245; 455/412.1, 899
See application file for complete search history.

(56) References Cited

U.S. PATENT DOCUMENTS

| | | | | |
|---|---|---|---|---|
| 6,351,776 B1 * | 2/2002 | O'Brien et al. | | 709/245 |
| 6,356,941 B1 * | 3/2002 | Cohen | | 709/219 |
| 6,714,968 B1 * | 3/2004 | Prust | | 709/219 |
| 6,735,623 B1 * | 5/2004 | Prust | | 709/219 |
| 6,839,743 B2 * | 1/2005 | Shim | | 709/217 |
| 6,985,927 B2 * | 1/2006 | O'Brien et al. | | 709/213 |
| 7,506,034 B2 * | 3/2009 | Coates et al. | | 709/219 |
| 7,650,621 B2 * | 1/2010 | Thomas et al. | | 725/87 |
| 7,894,803 B2 * | 2/2011 | Kamada | | 455/414.3 |
| 2002/0059621 A1 * | 5/2002 | Thomas et al. | | 725/87 |
| 2002/0123336 A1 * | 9/2002 | Kamada | | 455/420 |
| 2002/0128036 A1 * | 9/2002 | Yach et al. | | 455/552 |
| 2002/0133597 A1 * | 9/2002 | Jhingan et al. | | 709/228 |
| 2003/0191716 A1 * | 10/2003 | Woods et al. | | 705/50 |

* cited by examiner

*Primary Examiner* — El Hadji Sall

(57) ABSTRACT

Adapting web-based external storage, wireless device can posses huge amount of storage that current any wireless device's internal storage can not provide. To effectively let the storage server providing external storage (file system) for wireless device, the storage of a storage server need to be partitioned into multiple small storage volume and need to be exported to each specific wireless device. The console support software coupled with web-server software of a server provides both users of wireless device and console through web-browser to perform tasks of creating and utilizing external storage (file system). To support larger number of wireless devices with external storage, a central controlled distributed scalable virtual machine infrastructure can be deployed. The larger number of storage server controlled by a central control system can satisfy unlimited wireless devices external storage needs.

17 Claims, 18 Drawing Sheets

Wireless out-band download

Wireless devices supports in a simple environment

USE OF WIRELESS DEVICES' EXTERNAL STORAGE

CROSS REFERENCE TO PRIOR APPLICATION

This invention relates to the previous invention, application No. 60/401,238 of "Concurrent Web Based Multi-task Support for Control Management System". This invention also relates to previous invention, application No. 60/402,626 of "IP Based Distributed Virtual SAN".

FIELD OF THE INVENTION

This invention focuses on how a wireless device can actually use external storage provided by a storage server. This invention also includes how a wireless device can download data to its external storage.

BACKGROUND INFORMATION

Terminology:
The terminologies described in next few sections reflect the scope and are part of present invention.
The Internal Storage of a System:
The storage media such as hard disk drives, memory sticks, memory etc. is connected to a system directly through bus or a few inches of cable. Therefore, the storage media actually is a component of the system in an enclosure.
The External Storage of a System:
The external storage media is not a component of the system in the same enclosure. Therefore, they have to be connected through a connecting medium (e.g. a cable) such as Ethernet cable for IP based storage, Fiber channel cable for fiber channel storage, or such as wireless medium and etc. The storage media of an external storage could be magnetic hard disk drives, solid state disk, optical storage drives, memory card, etc. and could be in any form such as Raid which usually consists of a group of hard disk drives.
The Storage Partition, its Volumes, and the Corresponding File System:
To effectively use storage system, each storage device usually needs to be partitioned into small volumes. After the partition, each of the volumes can be used to establish a file system on it. To simplify the discussion herein, the term of the storage volume, its corresponding file system, and the term of the partition of the storage device are often used without differentiation.
CCDSVM:
It is an abbreviation for a central controlled distributed scalable virtual machine system. The CCDSVM allows a control management station to control a group of systems and provide distributed services to a client system on the Internet, the Intranet, and an LAN environment.
ISP & ASP:
The ISP refers to Internet service provider and the ASP refers to application service provider.

FIGURES

FIG. 1 illustrates an embodiment of the instant application, the FIG. 1 is the same as FIG. 1 of the previous application of the "Concurrent Web Based Multi-task Support for Control Management System" with an exception of replacing a console host with a wireless device.
FIG. 2 is the same as FIG. 1 of the above except that it shows a more detailed storage system controlled by a server. In addition, multiple wireless devices are presented to access the storage system.
FIG. 3 shows a scheme of a wireless device downloading contents from an ISP/ASP or other web sites to an external storage allocated for the wireless device.
FIG. 4 is similar to the FIG. 1 of the previous application of the "IP Based Distributed Virtual SAN" with exception that each IP storage server provides a file system as external storage for each of the wireless devices instead of providing IP based virtual SAN service. Also, each host of mentioned FIG. 1 actually is replaced by a wireless device of present application.

Unless specified, the programming languages and the protocols used by each software modules of instant application, and the computing systems used in this invention are assumed to be the same as described in the previous patent applications.

In addition, in the drawing, like elements are designated by like reference numbers. Further, when a list of identical elements is present, only one element will be given the reference number.

BRIEF DESCRIPTION OF THE INVENTION

Today the wireless users commonly face a problem of lack of storage capacity on their wireless devices such as cell phone or PDA, which are usually limited to 256 MB for PDA and much less for cell phone. To effectively solve this problem and let users own multiple gigabytes (GB) of storage for their wireless devices as well as allowing the users to use the GB storage for their multimedia applications, the storage of a server can be used as the external storage for the wireless devices. This technology has been briefly introduced in the previous parent patent applications.

Now let us examine how the external storage can actually be used by the wireless devices. First, let each server unit (e.g. the server 3 of the FIG. 2) partitions its storage system into volume and each of the volumes will have multiple GB in size. Therefore, each user of the wireless devices can be exclusively assigned and access a specific storage volume. For example, if we need to provide each user a 4 GB storage space, then a 160 GB disk drive can support 40 users. Therefore, a 4096 GB storage system on the server unit can support a total of 1024 wireless devices for users. Further, any data on the wireless device can be transmitted to an assigned storage volume. In addition, the user of the wireless device also can download the multimedia data from an ISP or ASP to the assigned storage volume of a designated server unit through out-band approach shown in FIG. 3. Finally, the user can use a web-browser, which has a functionality of invoking embedded video or music, to enjoy his/her stored multimedia contents.

These and other futures, aspects and advantages of the present invention will become understood with reference to the following description, appended claims, and accompanying figures:

DESCRIPTION OF THE DRAWINGS

In FIG. 1, the console support software (5) on the server (3) can be configured to support web-based multi-tasks for the user of the wireless device (1) via a web browser 8. Further, the user of the wireless device is able to perform creating structured layered files, directories, or folders, and perform data management operations, such as delete, move, copy, rename for data files or folders, directories and etc. on an assigned storage volume associated with the server (3).

Figure 1:
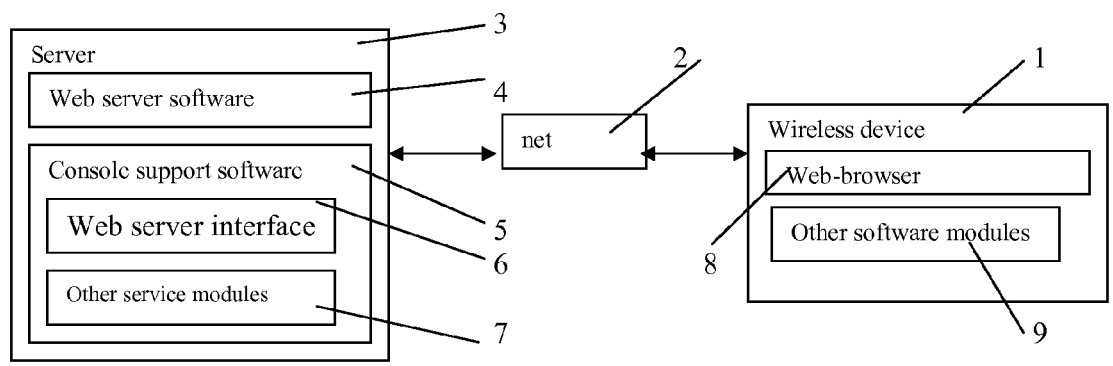
Referring now to FIG. 1, it demonstrates a configuration comprising a network connecting a wireless device and a server. In the FIG. 1, Net (2) represents a communication link, which may be combined with wireless and wired connection media and guarantee that the communication packets can be sent/received between the wireless device and the server. It is also assumed that the net (2) representing an communication infrastructure is built up in such way that a user of a wireless device can access and browse any web-site on the Internet, the Intranet, or a local area network (LAN).

In addition, the other software modules (9) of the wireless device (1) is configured to send data to or receive data from the other service modules (7) running on the server (3) via communication link (2) through a suitable IP or non-IP based protocol. The data being sent cold be a digital photo picture, a message and etc.

Also, the console supporting software (5) of the server (3) and the other software modules (9) of the wireless device (1) can be implemented with any suitable languages such as C, C++, Java, etc. depending on the implementation.

Besides, the web-browser (8) of the wireless device (1) can be implemented any suitable software. The web browser is configured to communication with web server software (4) on the server (3) with any other web server through the HTTP protocol.

Figure 2:
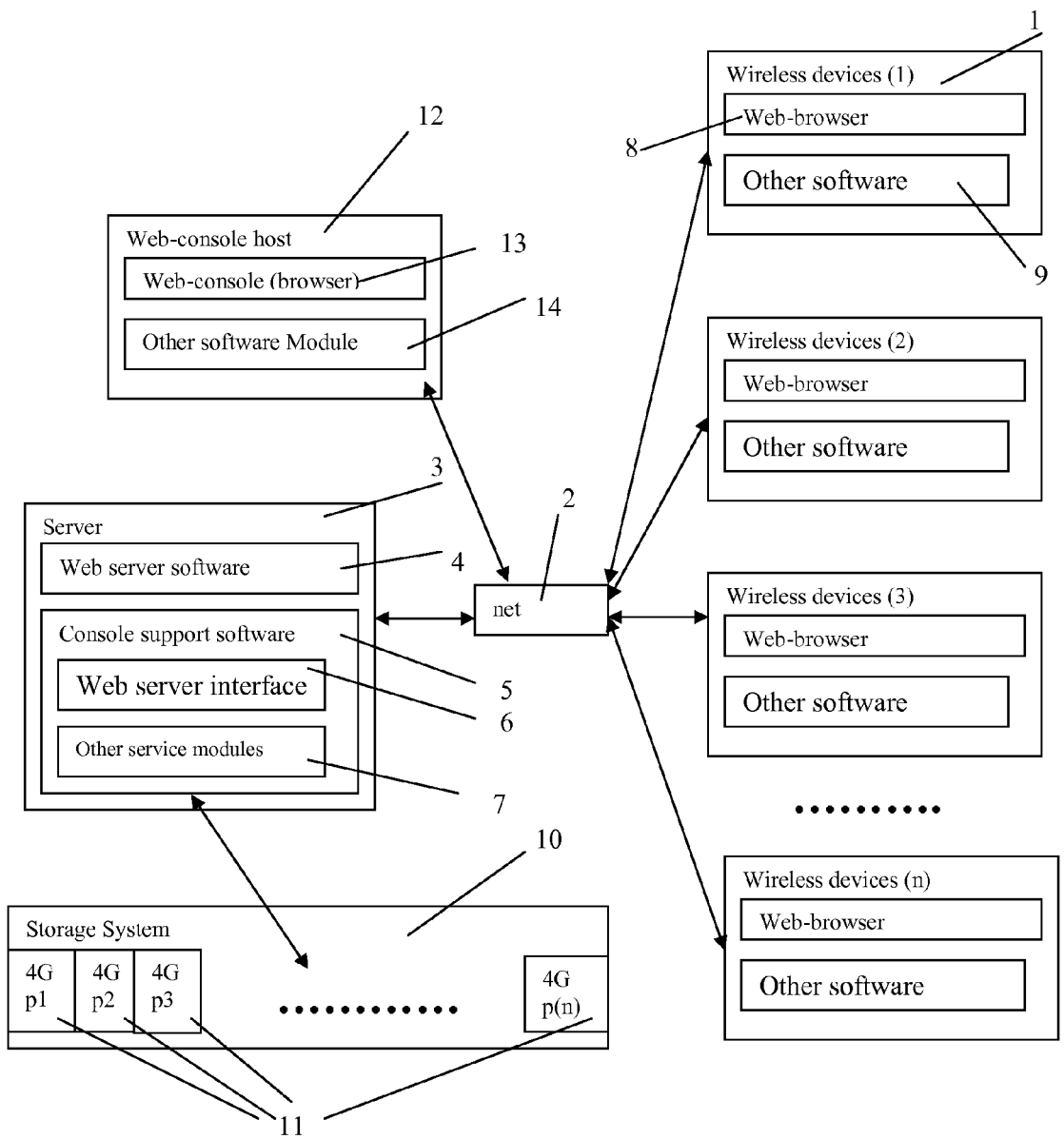

On the other hand, FIG. 2 has demonstrated that the storage system 10 of a server 3 can be allocated to multiple wireless devices. First, the storage system (10) of the server (3) can be partitioned into multiple storage volumes (11) by administration staff through a web-console (13) of a console host (12).

Second, the storage system (10) of the server (3) can be partitioned in such way that each of the wireless devices can be allocated with a storage volume having a desired size, therefore, the server 3 can support maximum numbers of the wireless devices.

In addition, the storage connection media could be any kind of cables, such as SCSI cable, IP cable, Fiber cable etc. or could be wireless communication media. The storage system itself could be various types.

Finally, the storage system 10 can be accessed by each of the wireless devices through IP or non-IP based network and protocols.

Figure 3:
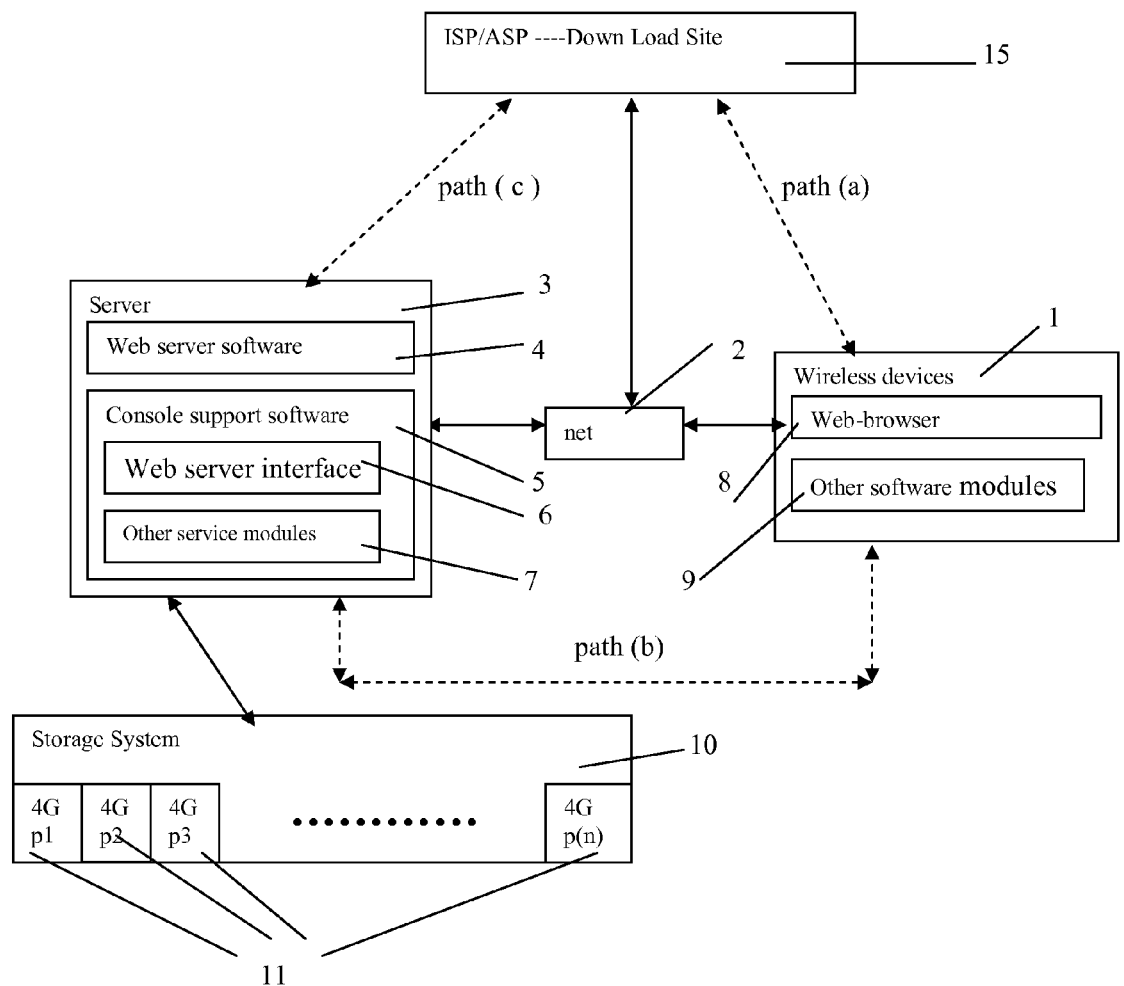
Figure 4:
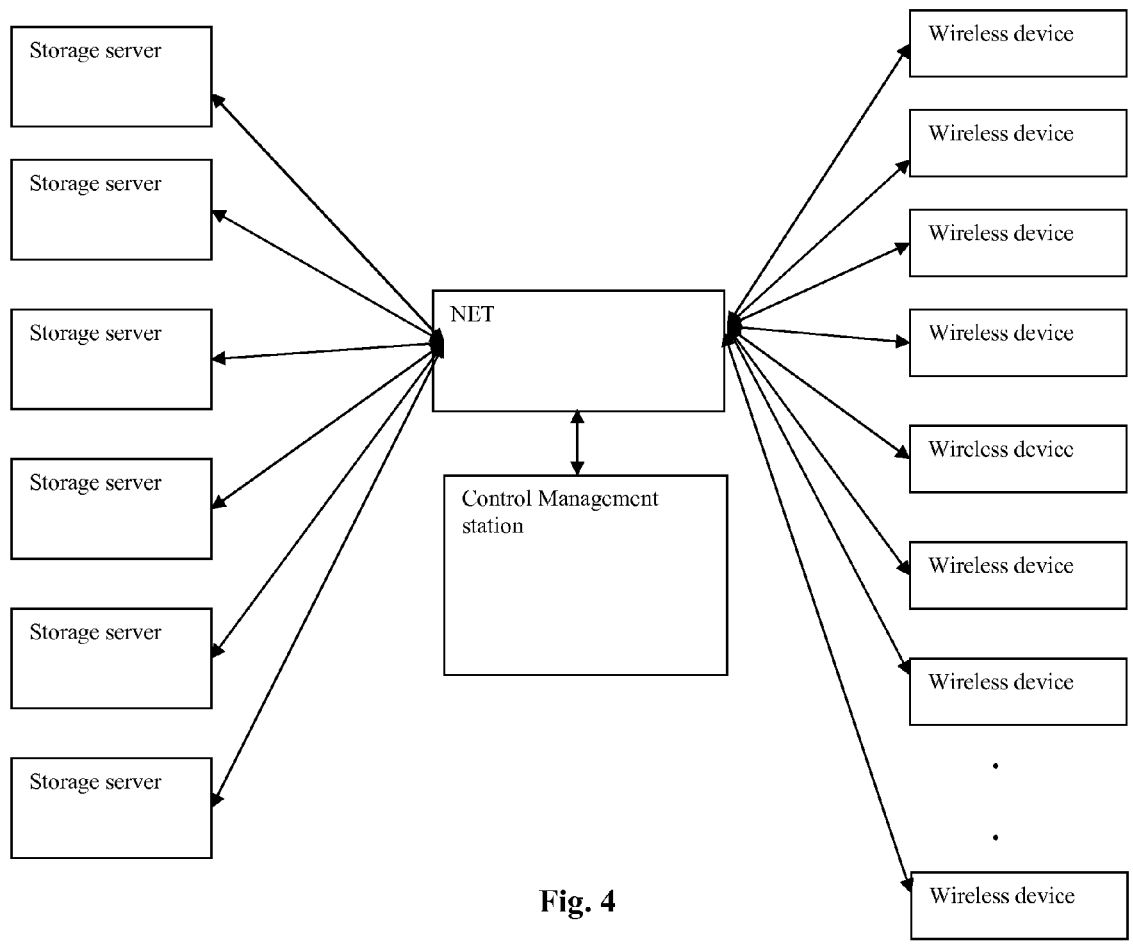
Figure 5:
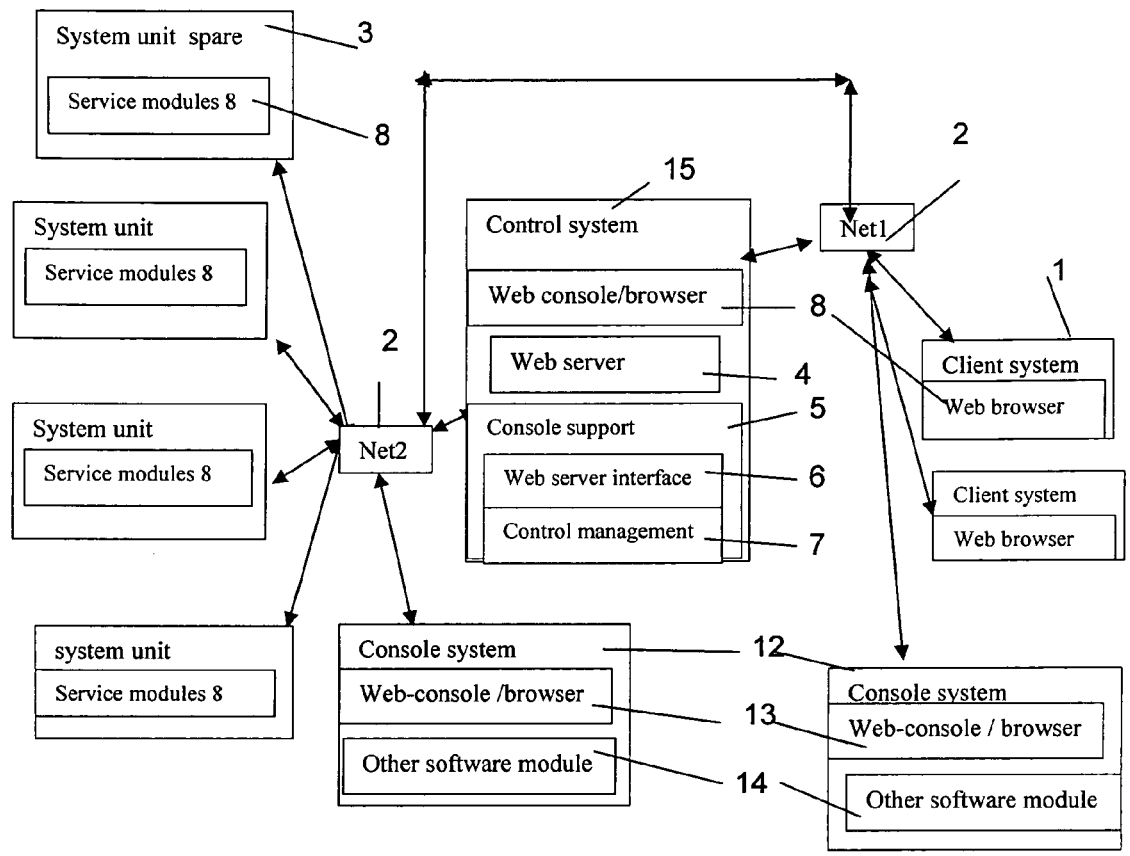
Figure 6:
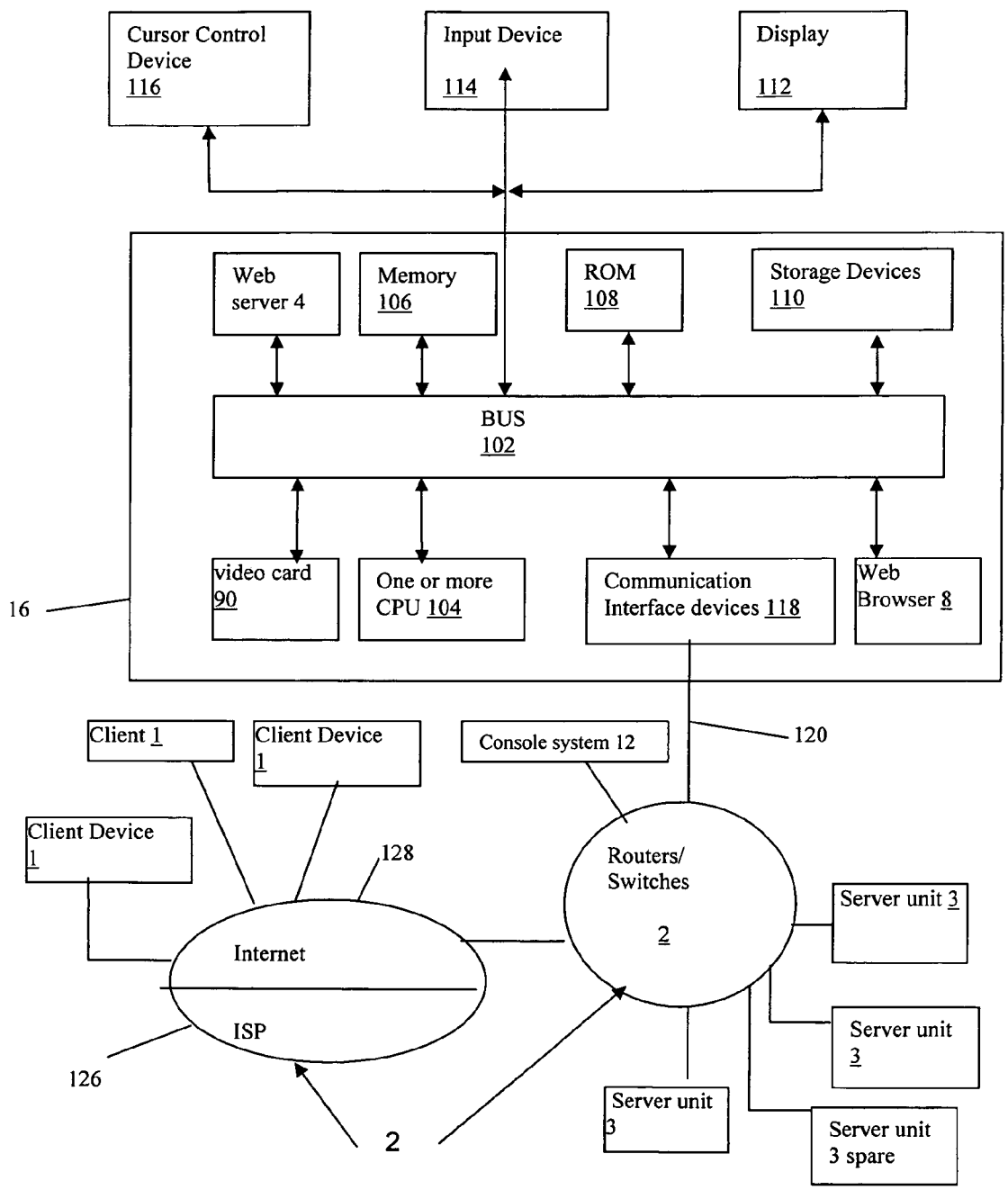
Figure 7A:
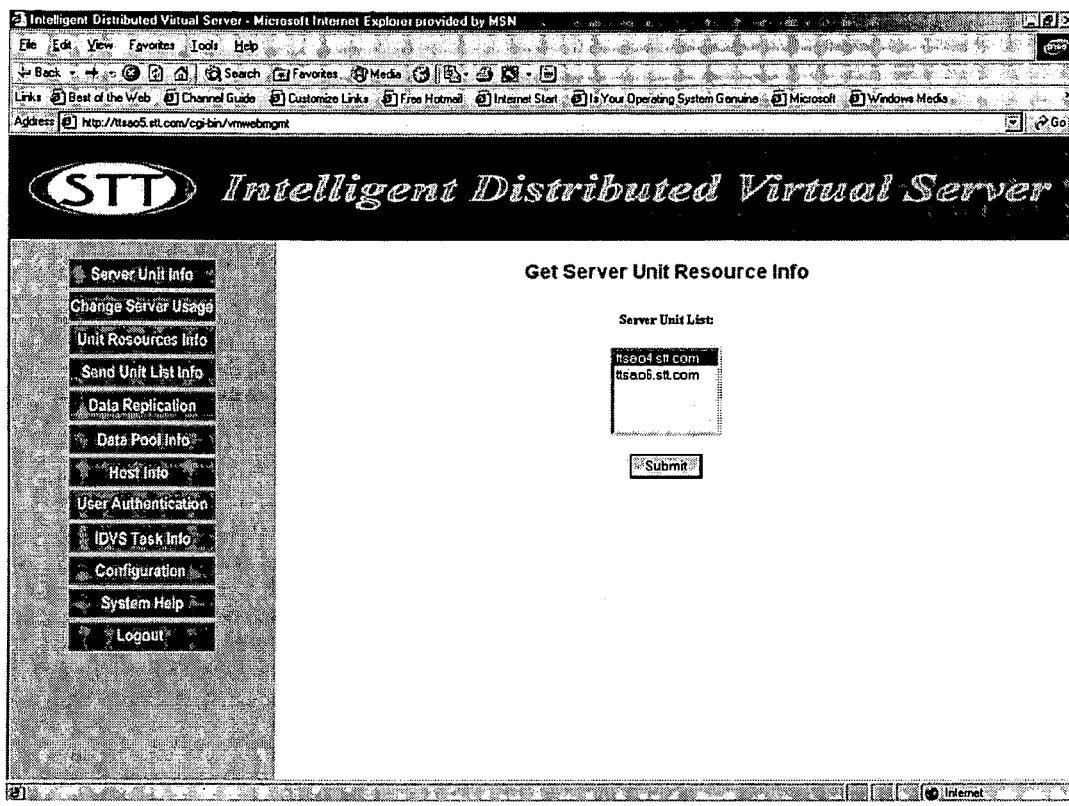
Figure 7B:
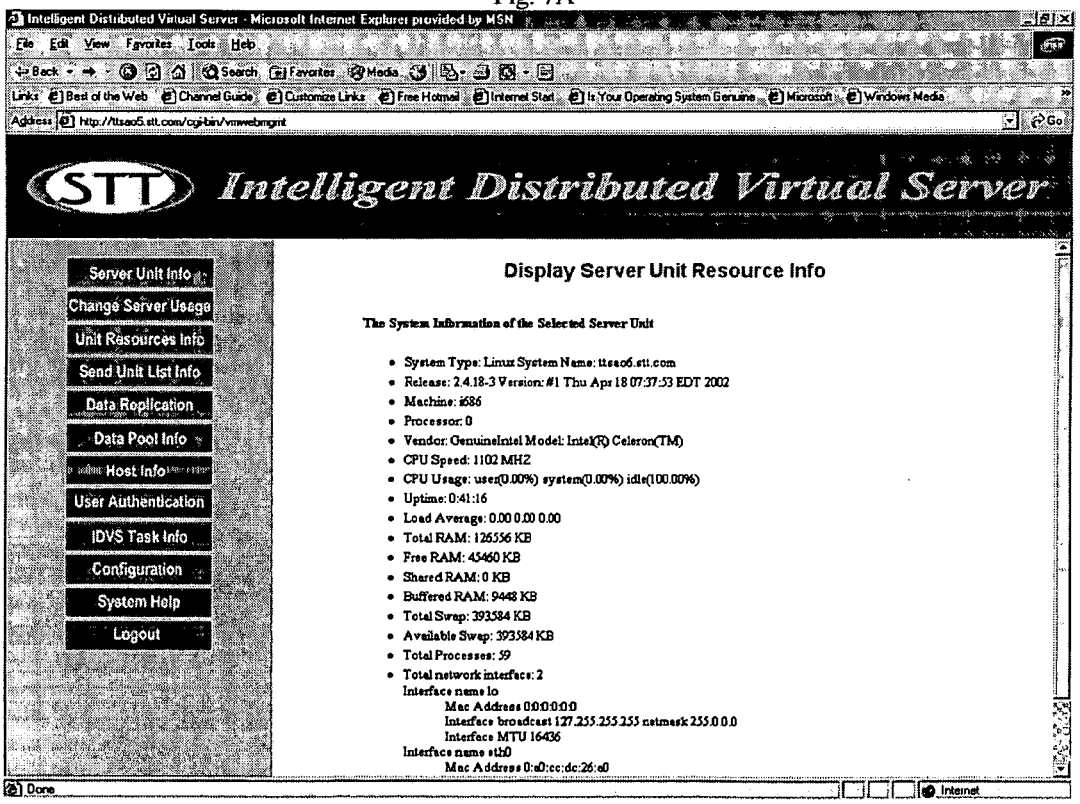
Figure 7C:
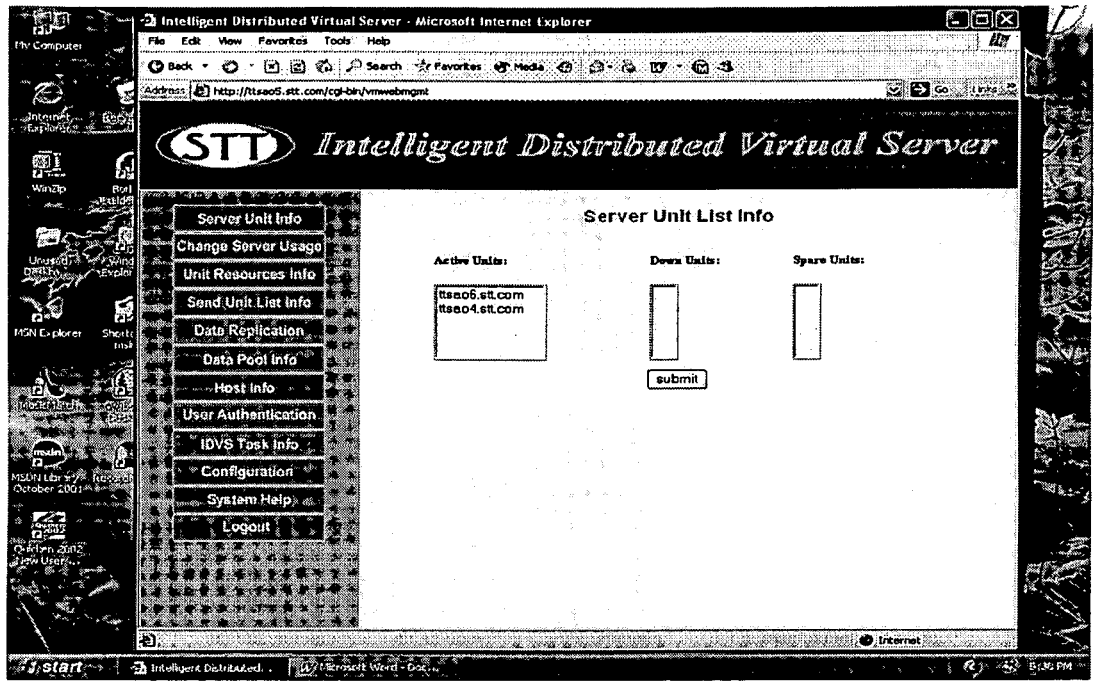
Figure 7D:
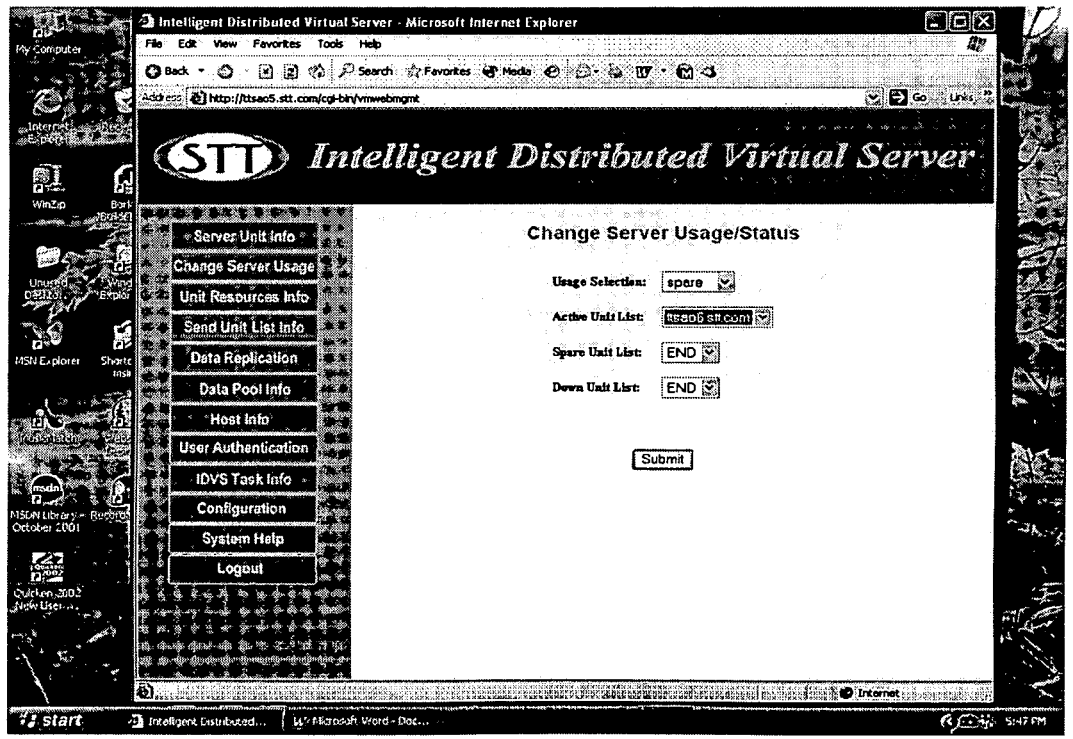
Figure 7E:
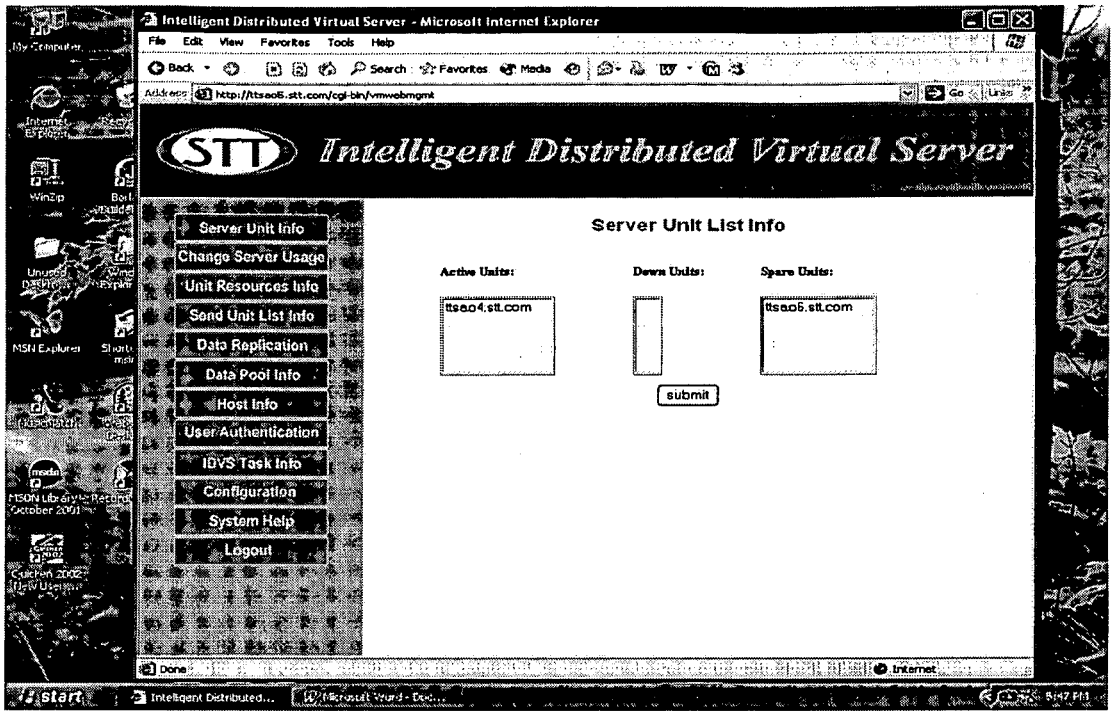
Figure 7F:
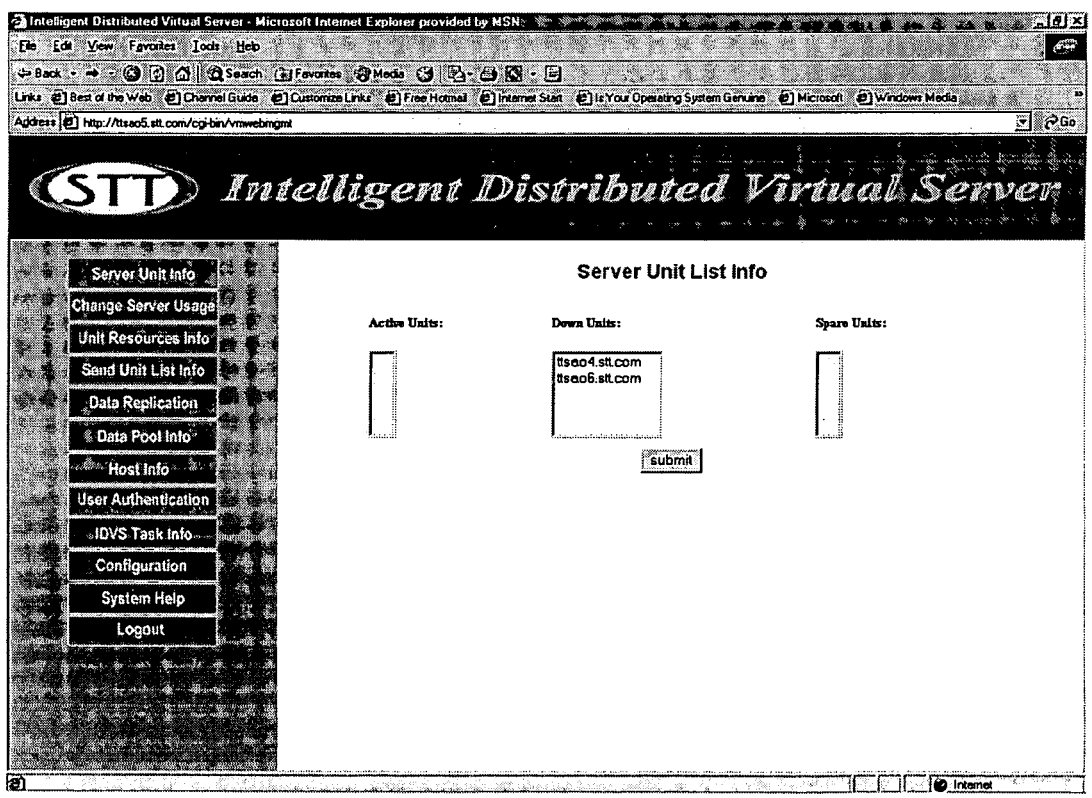
Figure 8A:
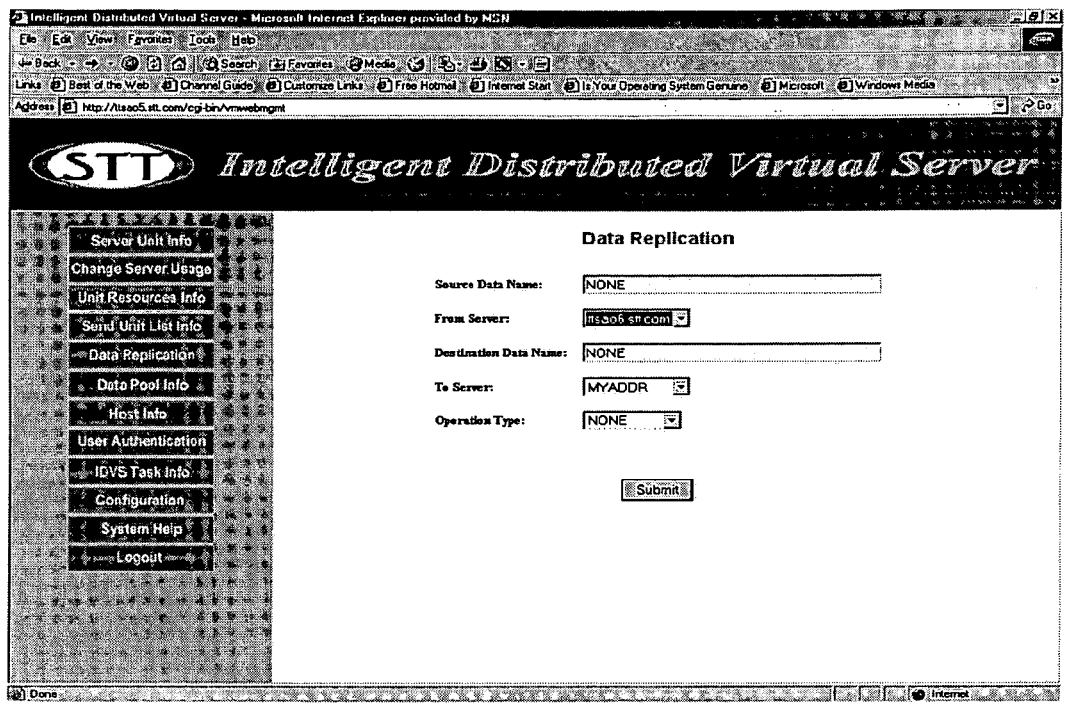
Figure 8B:
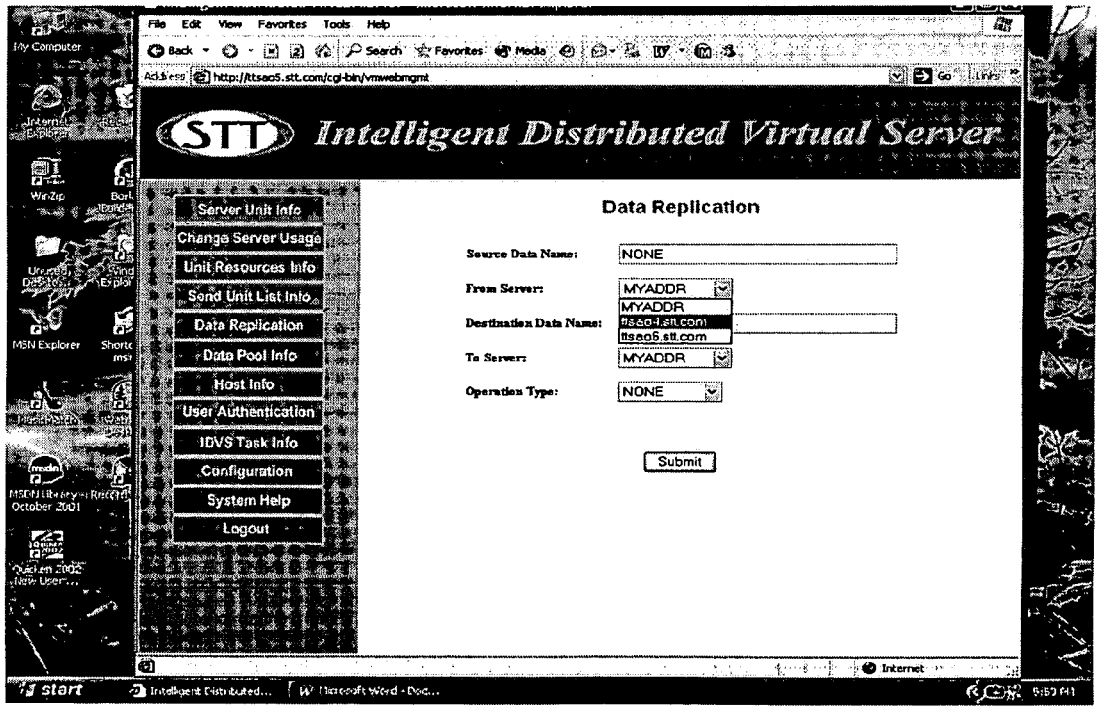
Figure 8C:
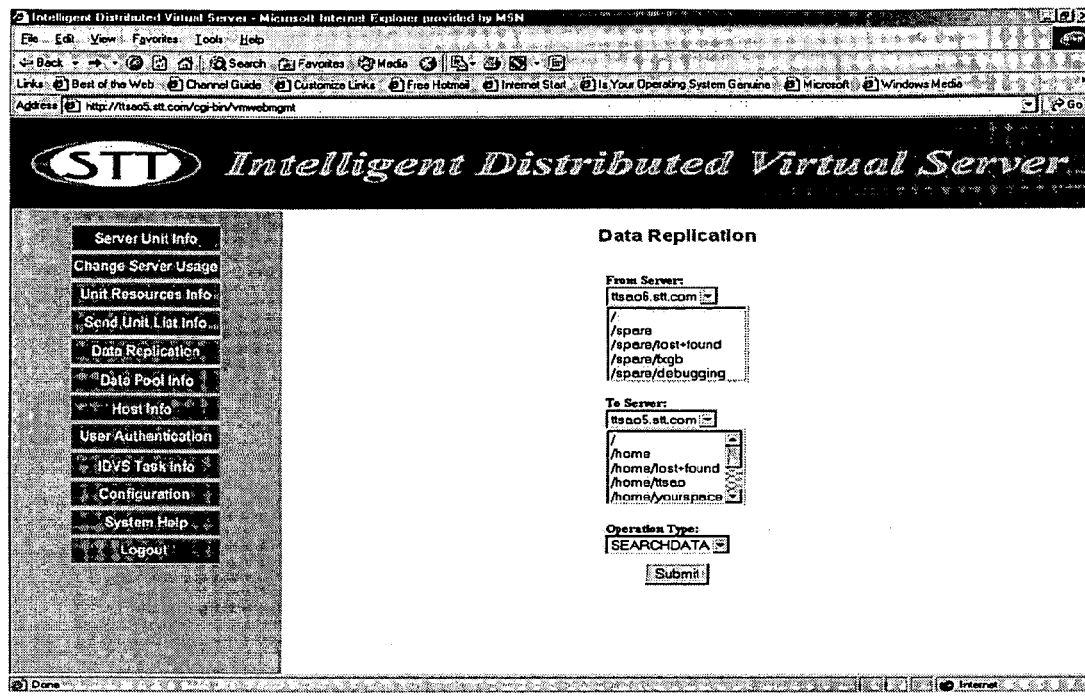
Figure 8D:
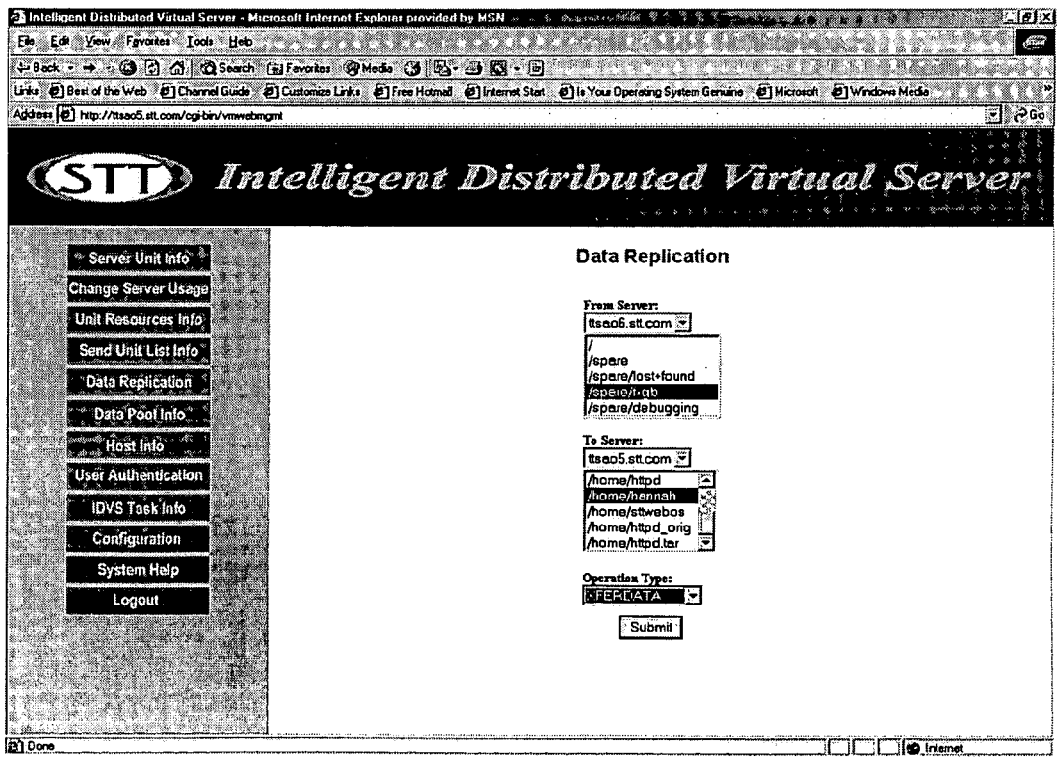
Figure 9A:
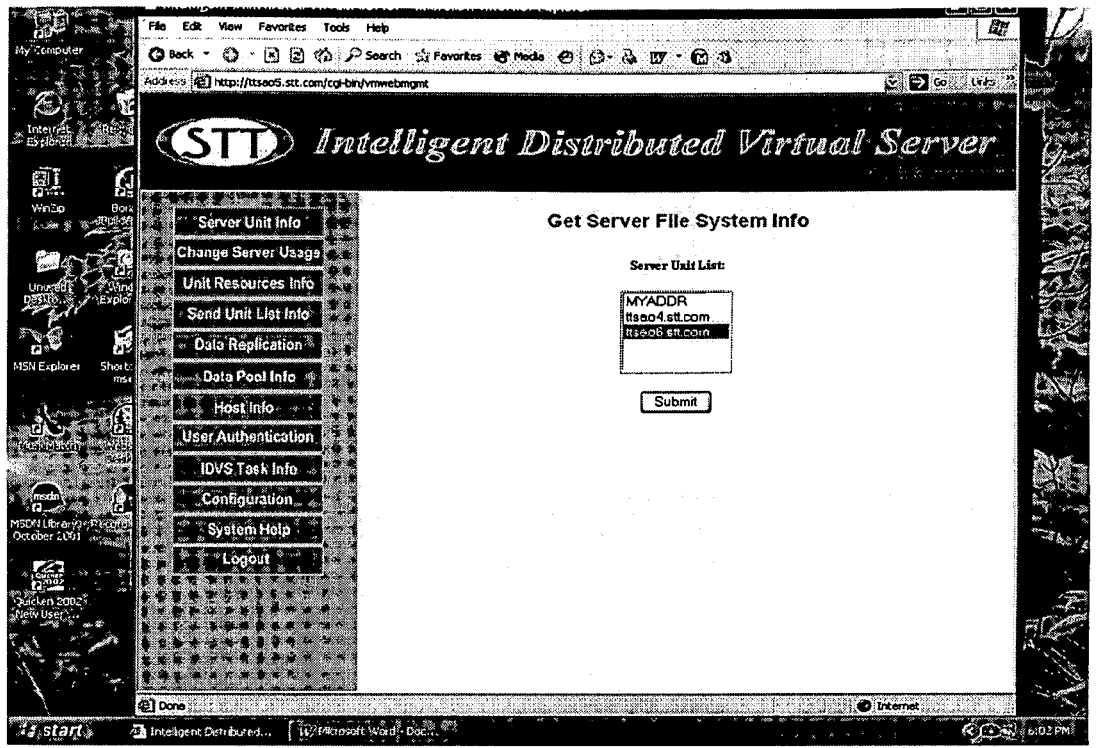
Figure 9B:
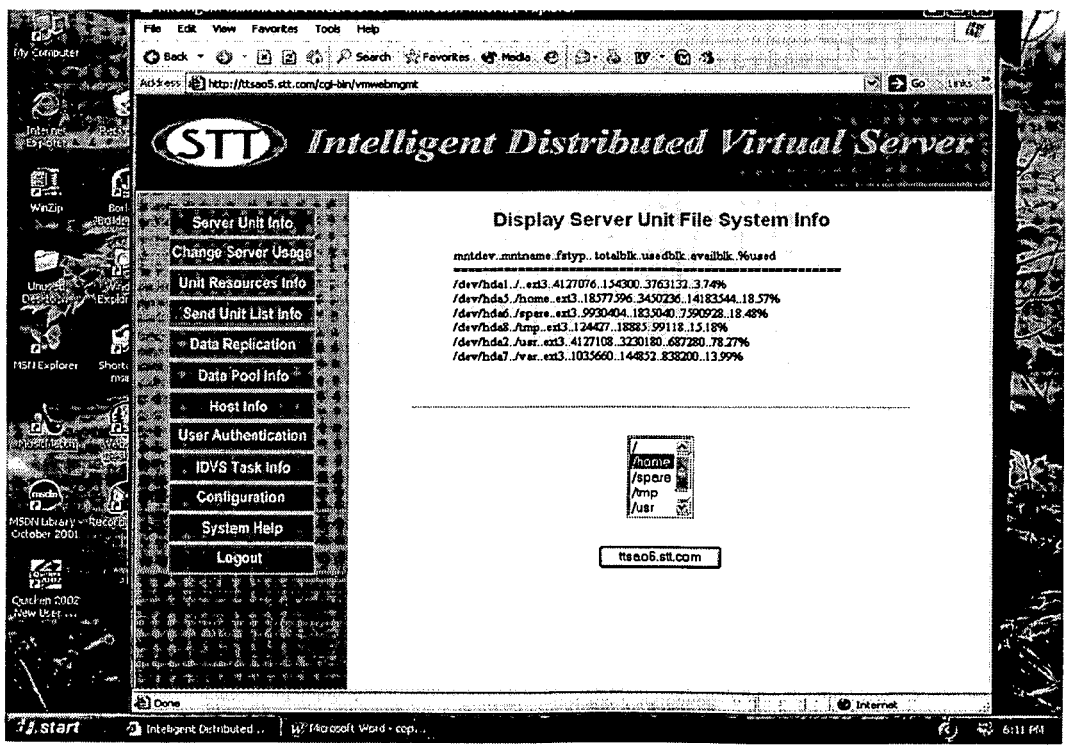
Figure 9C:
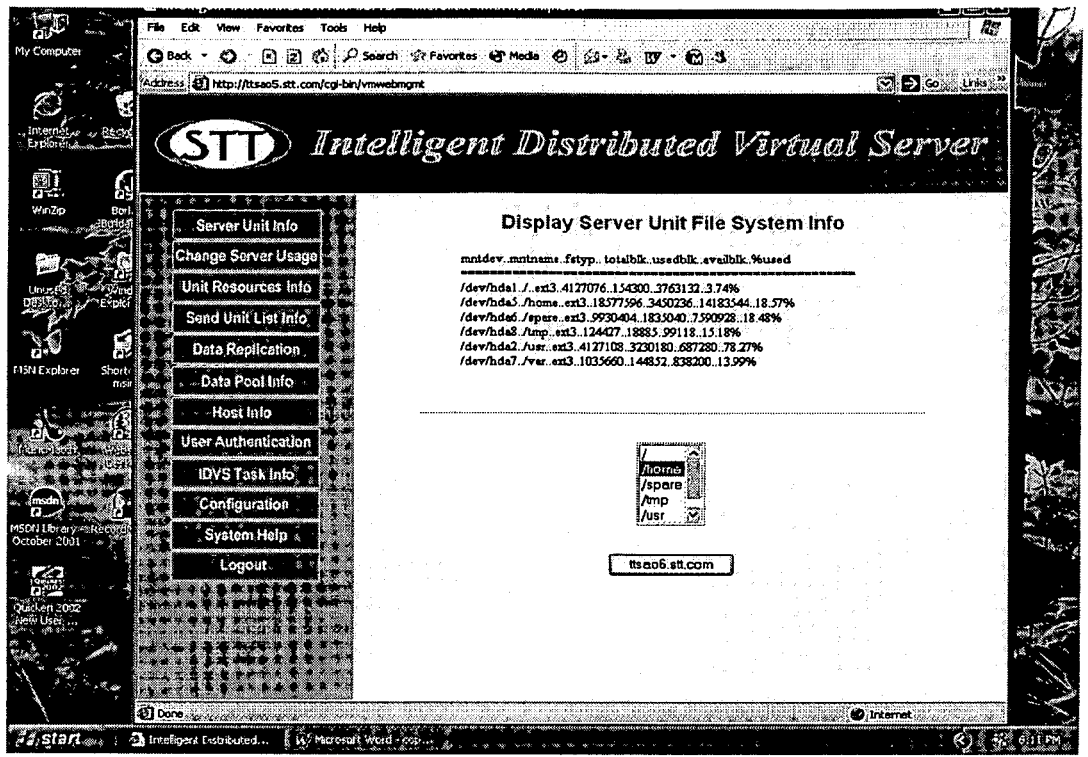
Figure 9D:
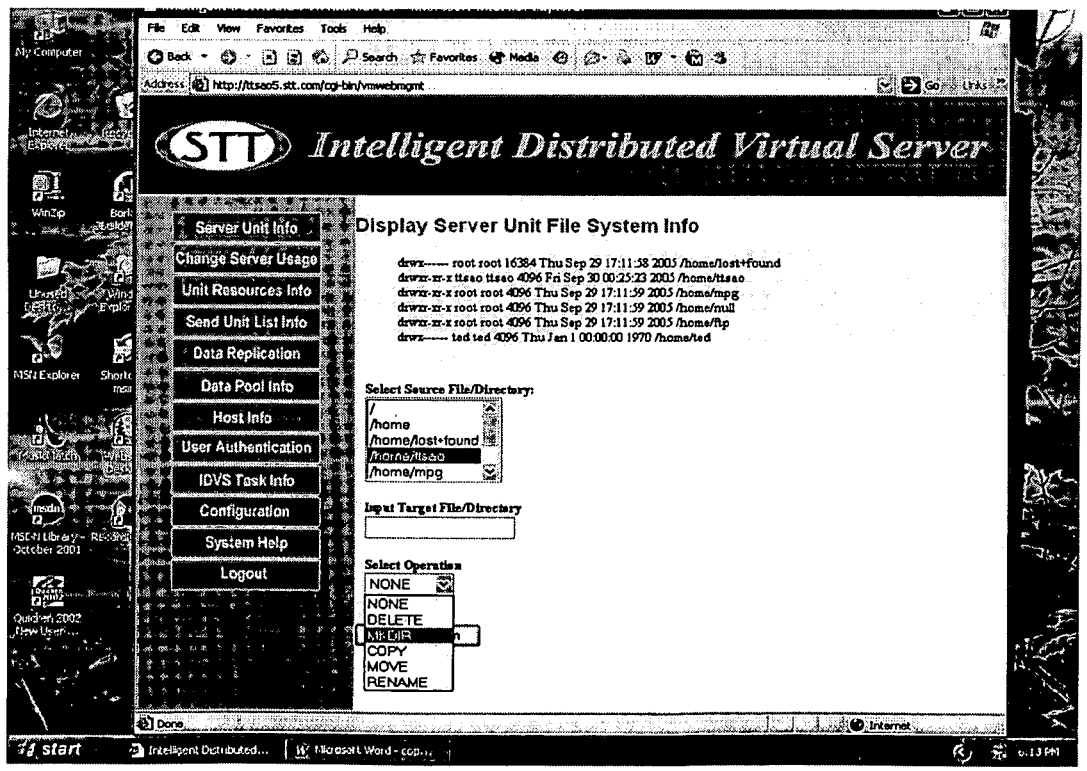
Figure 10A:
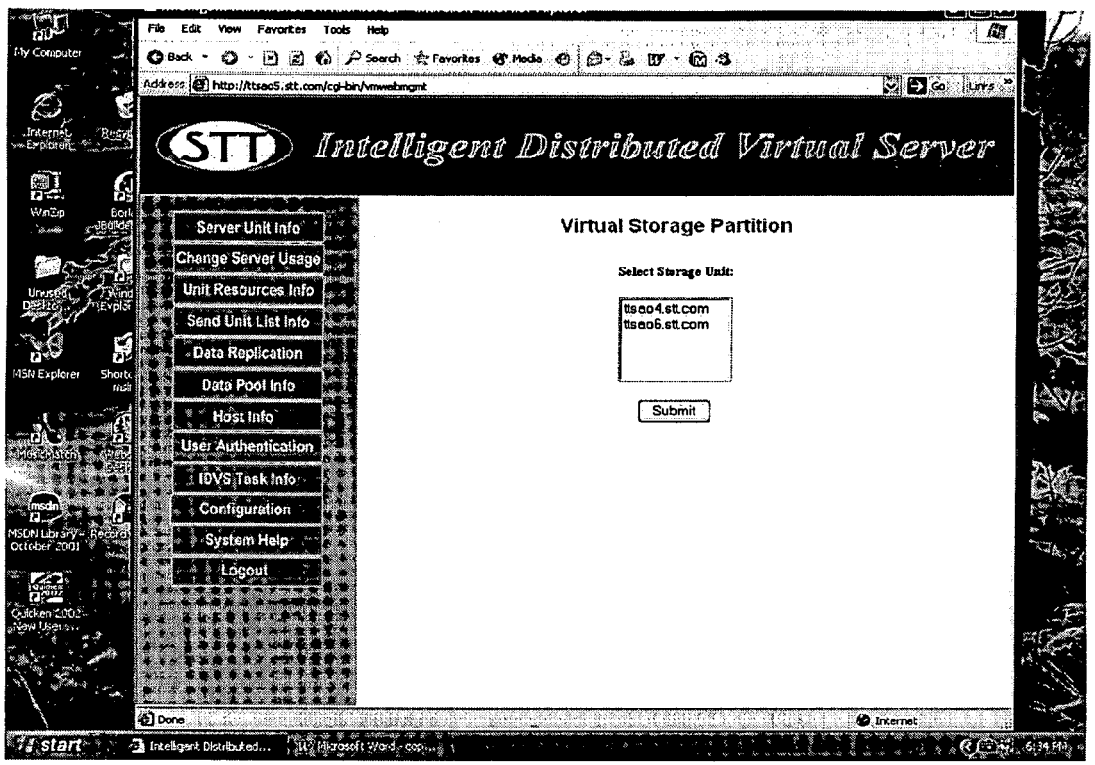
Figure 10B:
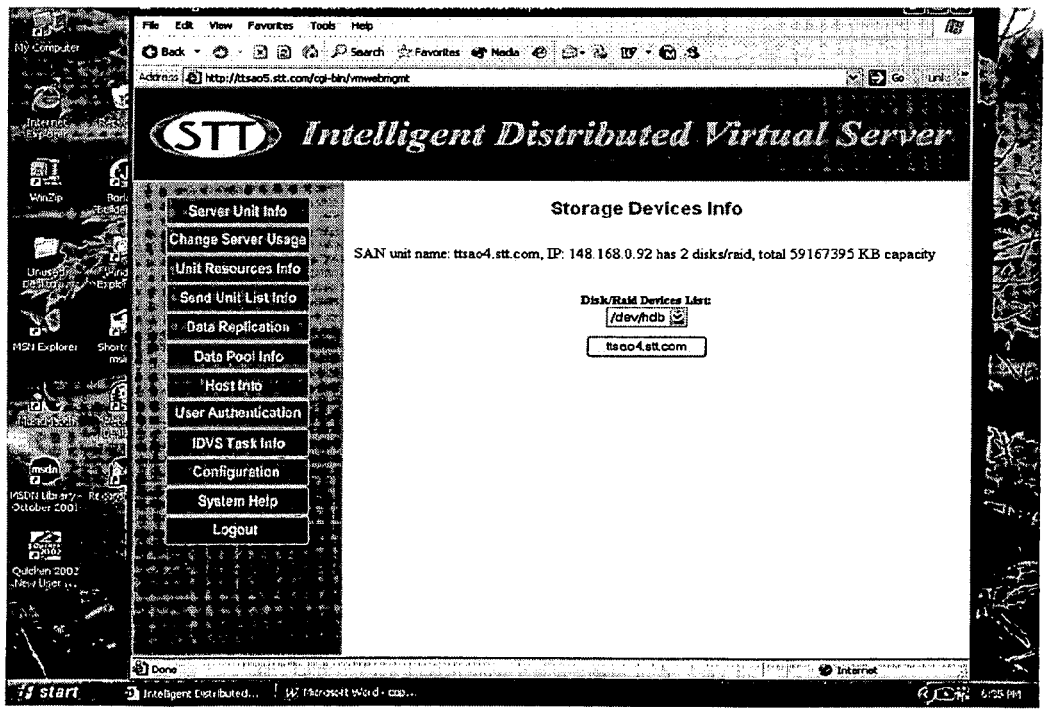
Figure 10C:
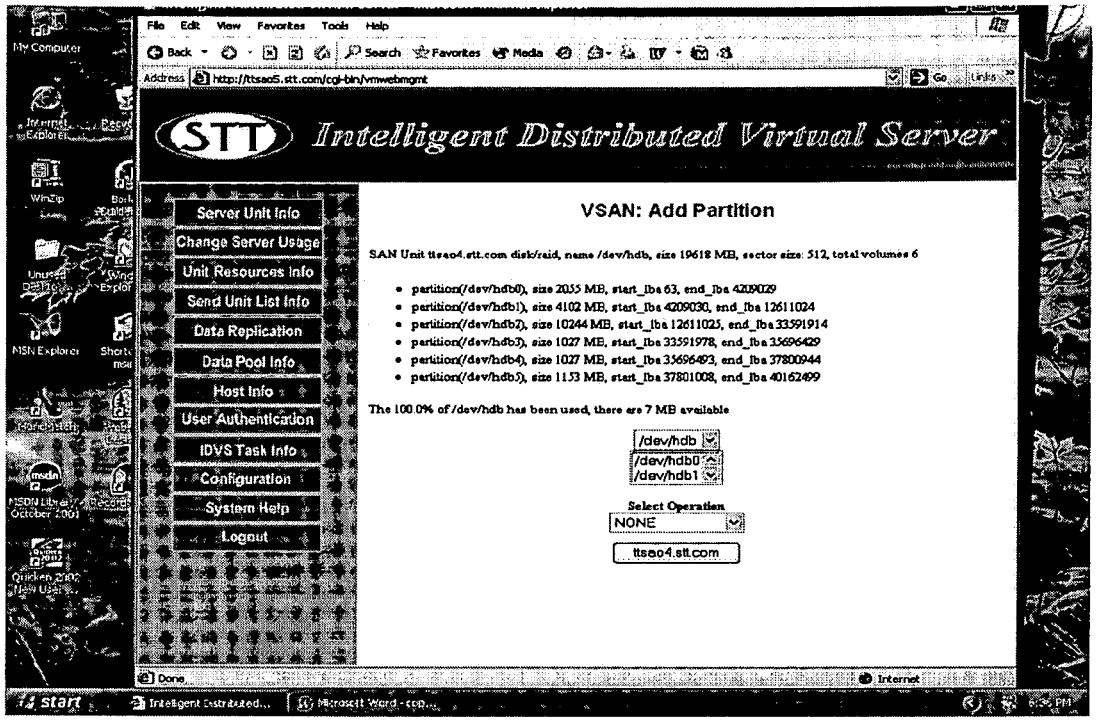
Figure 10D:
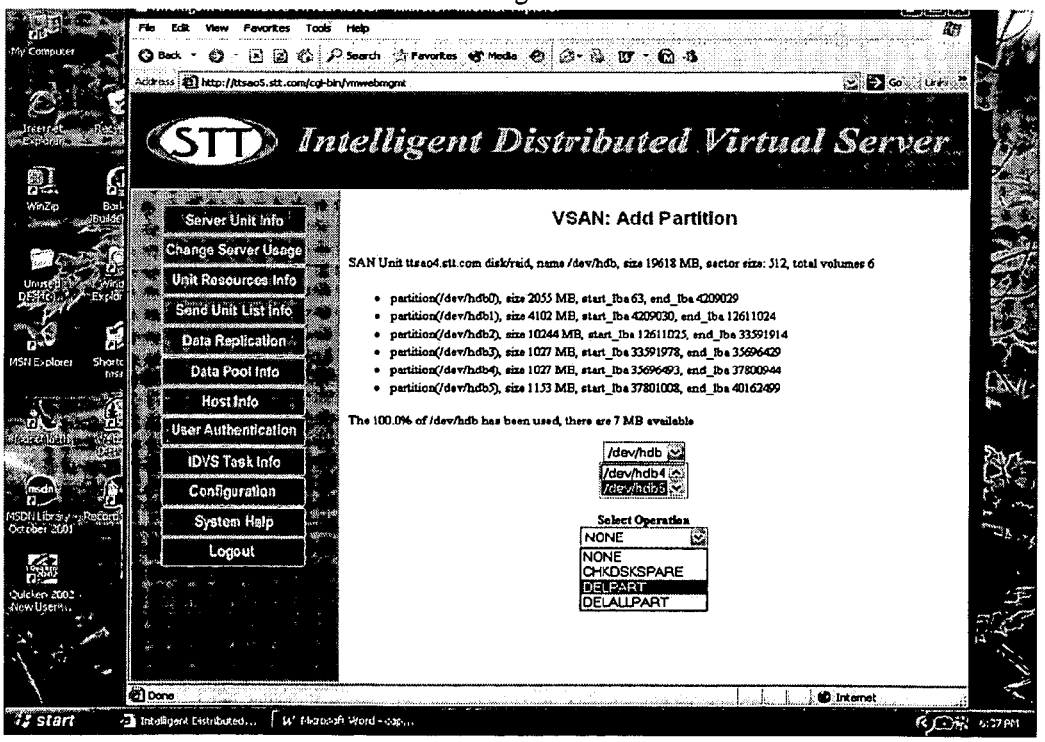
Figure 10E:
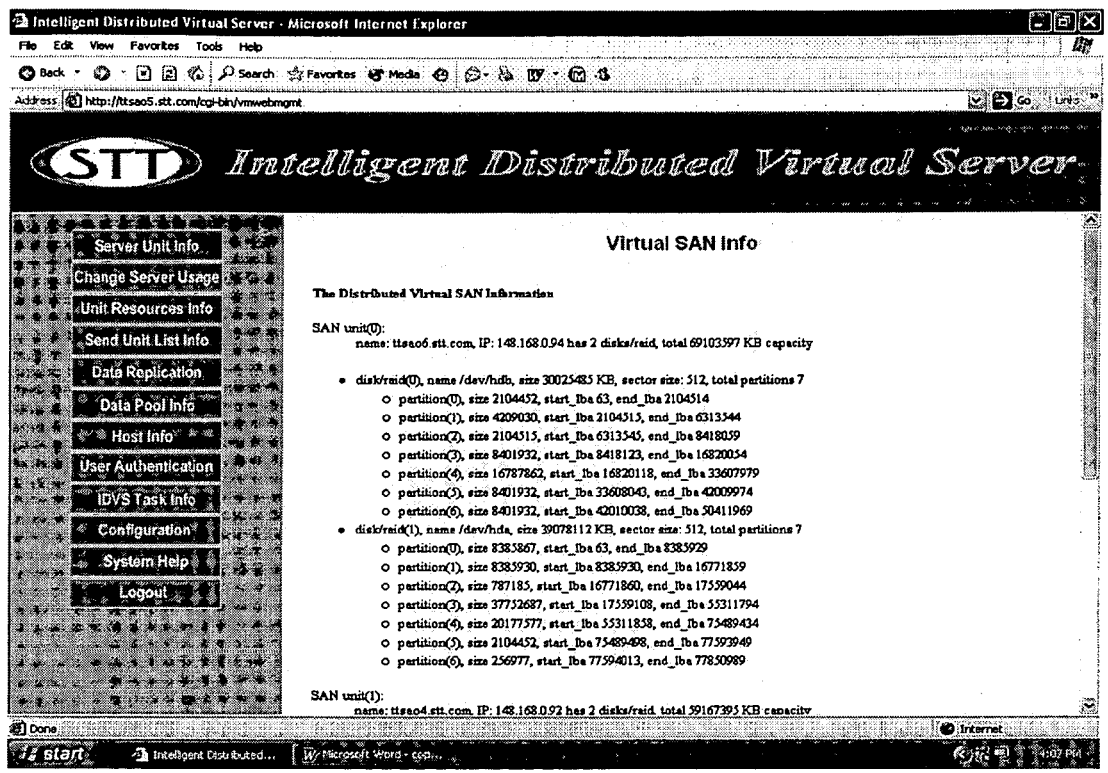
Figure 10F:
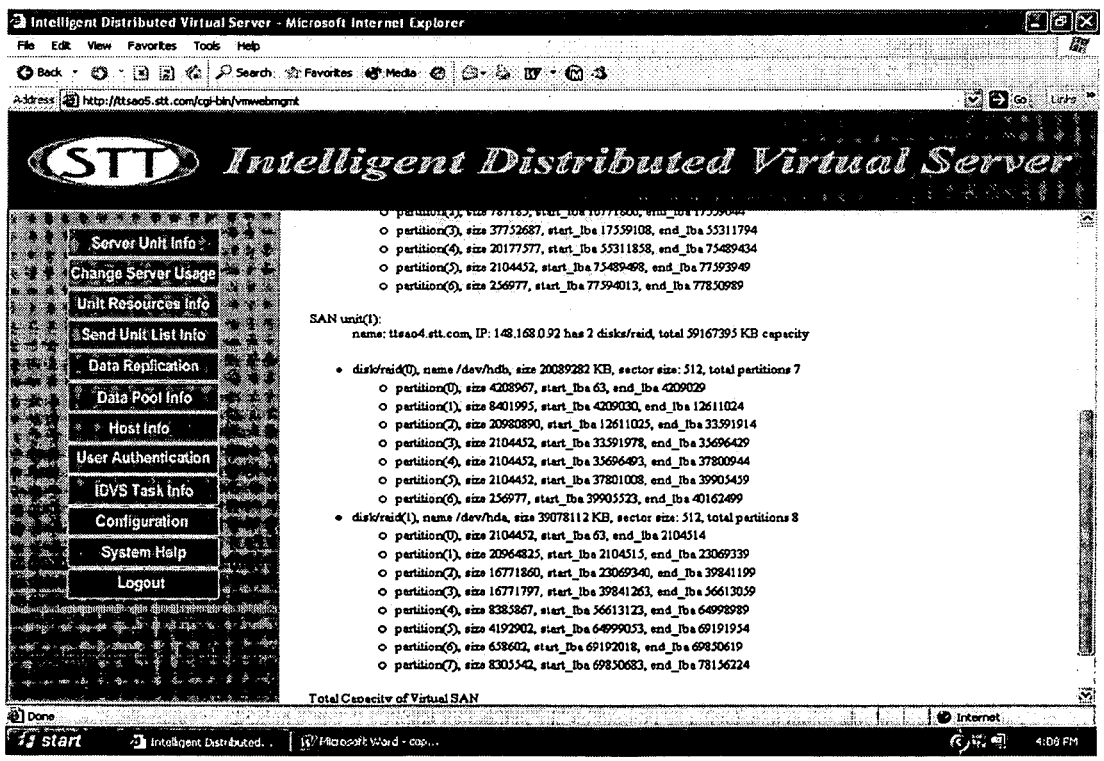
Figure 11A:
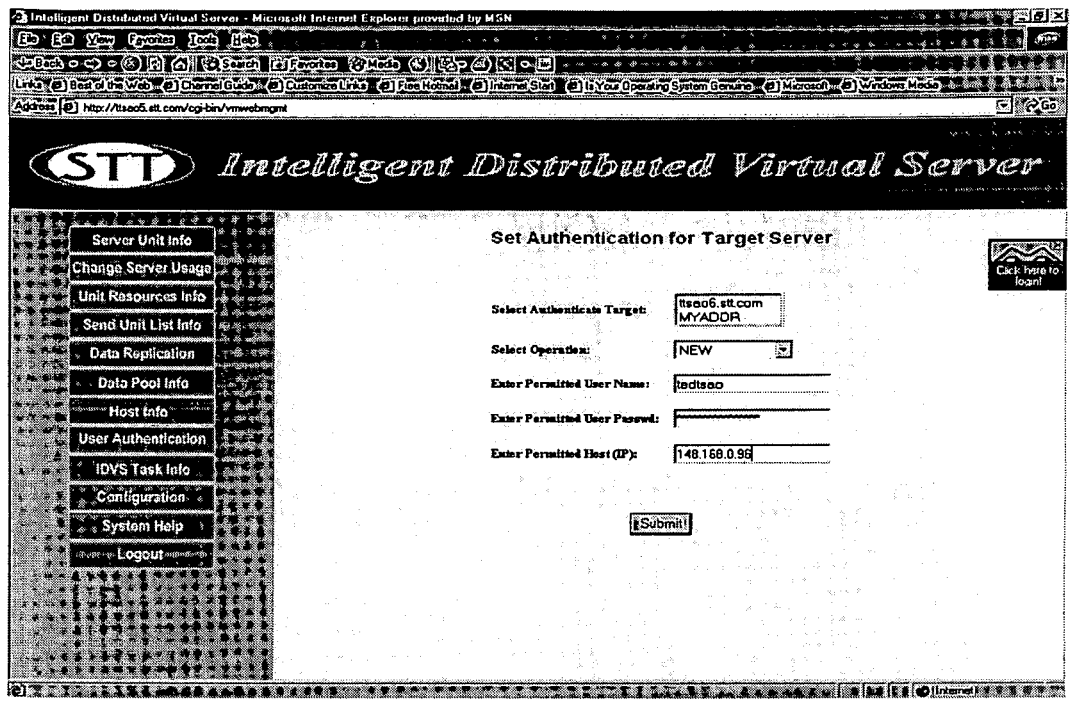
Figure 11B:
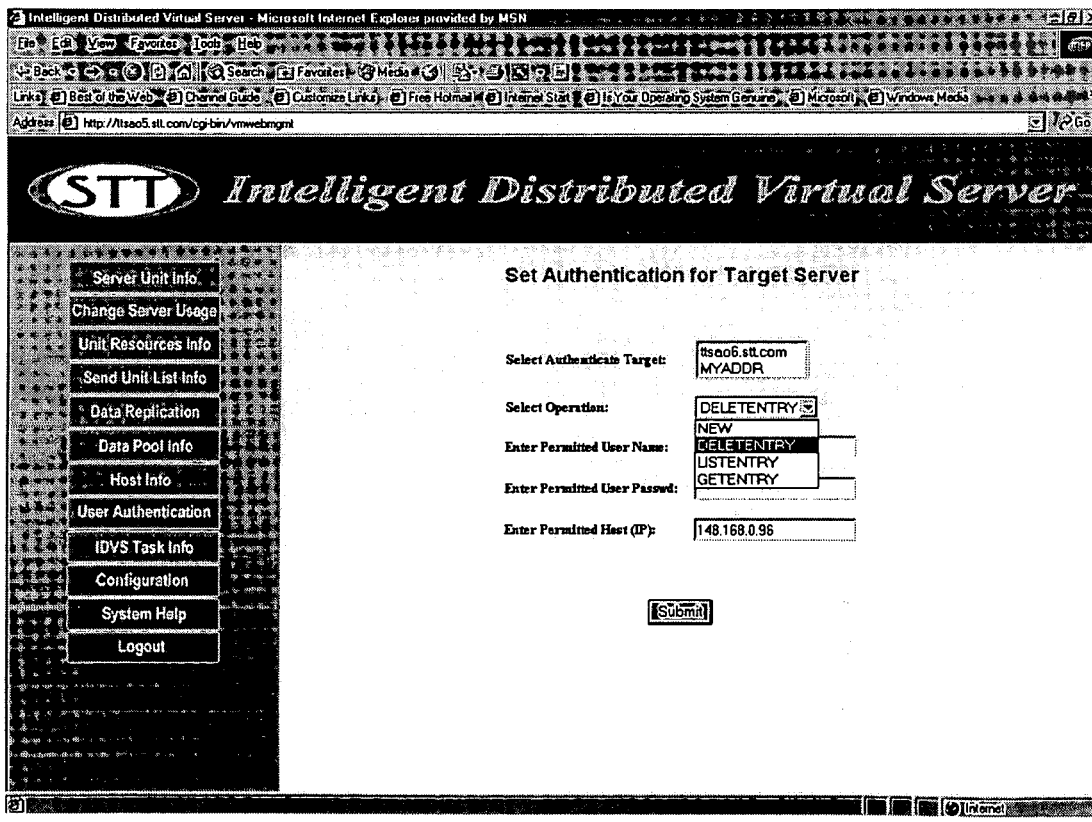
Figure 11C:
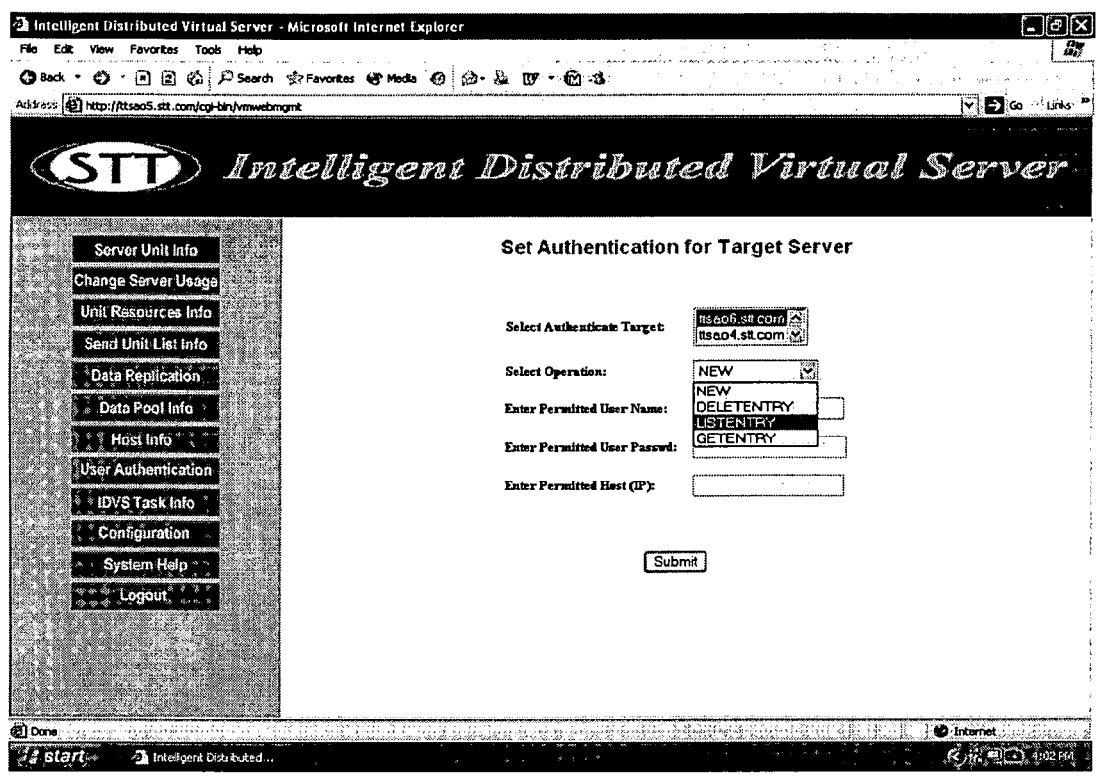

FIG. 3 has demonstrated that a user from a web-browser (8) on a wireless device (1) can download data from a known web-site (12) to his/her allocated external storage (10) on the server (3). The dash-lined path (a) represents a communication channel between the wireless device (1) and a remote downloading web-site (12) that provides downloading contents. The dash-lined path (b) represents a communication channel between the wireless devices (1) and the storage server (3). The dash-lined path (c) represents a communication channel between the server 3 and the remote web-server (12).

THE DETAILED DESCRIPTION OF THE INVENTION

The Use of the External Storage by the Wireless Device:

The FIG. 2 shows a simplified diagram of the wireless devices (1 of FIG. 2) using the external storage system (10 of FIG. 2) of the server (3 of FIG. 2) for effectively resolving the storage limitation problem for the wireless devices (1 of FIG. 2).

Partition Storage Volumes (FIG. 2)

With this invention, the entire storage (10 of FIG. 2) on the server (3 of FIG. 2) needs to be partitioned into suitable size of volumes (11 of FIG. 2) such as 4 GB for each volume. This will allow the server 3 to serve maximum number of the wireless devices (1 of FIG. 2). With the web console support software (5 of FIG. 2) of the server (3 of FIG. 2), tasks of partitioning the storage system 10 can be done through a web-console (13 of FIG. 2) on a console host (12 of FIG. 2) by an administrative staff.

In order to support storage partitioning, first the console support software (5 of FIG. 2) of the server (3 of FIG. 2) must send storage information of the server (3 of FIG. 2) to the web-console (13 of FIG. 2) of the console host (12 of FIG. 2). The storage information includes each storage device's name and total size etc. Second, based on the received storage information the administration staff on the console host (12 of FIG. 2) can use a web-console (13 of FIG. 2) to fill out and send the storage partition information to the console support software (5 of FIG. 2) of the server (3 of FIG. 2). The storage partition information includes the number of the partitions (volumes) and the size of each partition (volume). Third, upon receiving storage partition information from the web-console (13 of FIG. 2) of the console host (12 of FIG. 2), the console support software (5 of FIG. 2) of the server (3 of FIG. 2) performs the actual storage partition to divide the entire storage into multiple small volumes. Finally, for each small storage volume, a corresponding file system could be built up.

Assign Storage Volumes (FIG. 2):

Each of the storage volumes together with its corresponding file system (11 of FIG. 2) on the storage system (10 of FIG. 2) of the server (3 of FIG. 2) needs to be exclusively allocated and exported to a specific wireless device (1 of FIG. 2) by the console support software (5 of FIG. 2) of the server (3 of FIG. 2).

Data and Storage Volume Management (FIG. 2)

With the support of the console support software modules (5 of FIG. 2) of the server (3 of FIG. 2), the user of the wireless device (1 of FIG. 2) can via the web-browser 8 of FIG. 2 setup folder/directory structure on the file system of his/her assigned external storage volume (11 of FIG. 2). In addition, the user of the wireless device (1 of FIG. 2) can via the web-browser 8 of FIG. 2 perform all data management operations such as delete, copy, move, rename etc. for file system.

In order to support such data management on the external storage (10 of FIG. 2) allocated to the wireless device (1 of FIG. 2) via the web-browser 8 of FIG. 2, first the console support software modules (5 of FIG. 2) of the server 3 of FIG. 2 must communicate with the web-browser (8 of FIG. 2) of the wireless device (1 of FIG. 2). Therefore, the user from the web-browser (8 of FIG. 2) of the wireless device (1 of FIG. 2) can choose desired data management operations and send operation information to the console support software modules (5 of FIG. 2) of the server 3 of FIG. 2. The mentioned operations include establishing folder/directory, copying, moving, or reaming data file etc. Second, upon receiving the data management operation, the console support software modules (5 of FIG. 2) of the server 3 of FIG. 2 actually process/executes these requested operations for the assigned file system of an allocated storage volume (11 of FIG. 2) on the server 3 of FIG. 2.

Store Data from Wireless Device into External Storage (FIG. 2)

To store the data such as digital photo pictures or messages into the file system on the allocated storage (10 of FIG. 2) of the server (3 of FIG. 2), the other software modules (9 of FIG. 2) of the wireless device (1 of FIG. 2) need to send these data to the other service modules (7 of FIG. 2) of the server (3 of FIG. 2) via communication link between them. Upon receiving the data, the other service modules (7 of FIG. 2) of the server (3 of FIG. 2) write these data to the file system of the allocated storage volume (11 of FIG. 2) for the wireless device. The protocol used between these two communication entities could be either IP or non-IP based protocol.

Download Data from a Remote Web Server Site into Allocated Storage Volume (FIG. 3)

If a user of the wireless device (1 of FIG. 3) wants to download a data from a remote web server (12 of FIG. 3) into the allocated file system (11 of FIG. 3) of the allocated storage (10 of FIG. 3) on the server (3 of FIG. 3), the following steps are required:

1) The user of the wireless device (1 of FIG. 3) via a web-browser (8 of FIG. 3) accesses a remote downloading web server site (12 of FIG. 3) to obtain information for the downloading via path (a) of FIG. 3. For example, the user accesses a web-page which contains the data name for the downloading.

2) The other software modules (9 of FIG. 3) of the wireless device (1 of FIG. 3) obtain the downloading information, which becomes available in the cached web-pages on the wireless device (1 of FIG. 3) after the web-browser (8 of FIG. 3) accessing the web site (12 of FIG. 3).

3) The other software modules (9 of FIG. 3) of the wireless device (1 of FIG. 3) send the obtained downloading information to other service modules (7 of FIG. 3) of the storage server (3 of FIG. 3) via path (b) of FIG. 3.

4) Upon receiving the downloading information from the wireless device (1), the other service module (7 of FIG. 3) of the storage server (3 of FIG. 3) sends a web download request to the web-site (12 of FIG. 3) via path (c) of FIG. 3 and receives the downloading data streams from the web server of the web-site (12 of FIG. 3).

5) Upon receiving downloading data streams, the other service modules (7 of FIG. 3) of the storage server (3 of FIG. 3) write the data streams into the allocated file system (11 of FIG. 3) on the server (3 of FIG. 3) for the wireless device (1 of FIG. 3).

Retrieve Data from Allocated Storage for the Wireless Device

1) If a web-browser (8 of FIG. 2) on a wireless device 1 of FIG. 2 has embedded video or music functionality, a user of the wireless device (1 of FIG. 2) can use the browser to retrieve and play multimedia data file such as video or music stored in the allocated storage volume (10 of FIG. 2) located on the server (3 of FIG. 2).

2) If there is a need, the other software module (9 of FIG. 2) of the wireless device (1 of FIG. 2) also can retrieve data file from the allocated file system of the allocated storage volume (11 of FIG. 2) on the server (3 of FIG. 2).

Support External Storage for a Large Number of the Wireless Devices

If there is a need to provide each user a 2 GB of storage space, then a 160 GB disk drive can support 80 users. A 4096 GB (4 Tera Bytes) storage system on the server unit can support 2024 user. Each of the server units only can efficiently support a limited size of the storage system. In order to support a large number of the wireless devices, such as for 500,000 wireless devices, a larger number of the servers is required, in this case 250 servers is required. In order to let a larger number of the servers to effectively support the larger number of the wireless devices, an infrastructure like CCDSVM is desirable, which has been described in previous patent applications. With the CCDSVM the control management station can control larger number of storage servers to provide external storage for a huge number of the wireless devices.

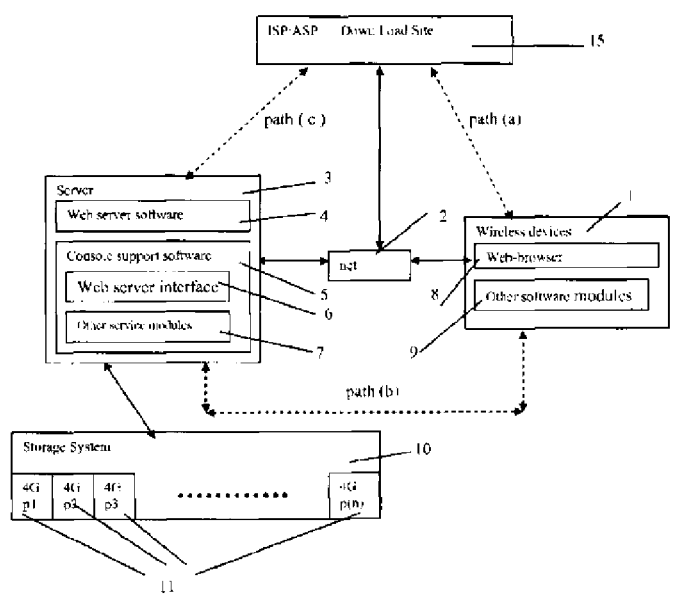

What is claimed is:

1. A method for expanding storage capacity of a wireless device, the method comprising:

allocating via a server a storage space of a predefined capacity for the wireless device, the storage space being remotely located with respect to the wireless device;

creating a file system for the storage space allocated for the wireless device;

establishing a link for the wireless device access to the storage space; and updating the file system whenever a user of the wireless device performs an operation to the storage space, wherein the updating of the file system comprises updating the file system for storing a file therein, the storing of a file including to download a file from a remote web server, according to download information for the file cached in the wireless device received therefrom, directly into the storage device when the user via a web browser executed on the wireless device to perform an operation of downloading the file from the remote web server to the storage space instead of downloading the file into the wireless device itself.

2. A system for expanding storage capacity of a plurality of wireless devices, the system comprising:

a server configured to:

allocate a storage space of a predefined capacity for each of the wireless devices, create a file system for the storage space allocated for the each of the wireless devices;

establish a link for the each of the wireless devices access to the storage space; and update the file system whenever a user of the each of the wireless devices performs an operation to the storage space, wherein the storage space being remotely located with respect to the each of the wireless devices, wherein the updating of the file system comprises updating the file system for storing a file therein, the storing of a file including to download a file from a remote web server, according to download information for the file cached in the each of the wireless devices received therefrom, directly into the storage device allocated thereto when the user via a web browser executed on the each of the wireless devices to perform an operation of downloading the file from the remote web server to the storage space instead of downloading the file into the each of the wireless devices itself; and the wireless devices, wherein each of the wireless devices is operable access to the storage space allocated to the each of the wireless devices.

3. The method as recited in claim 1, wherein the operation to the storage space comprises creating from the wireless device a folder in the storage space.

4. The method as recited in claim 1, wherein the operation to the storage space comprises deleting or moving or copying or renaming, from the wireless device, a file or a folder being stored in the storage space.

5. The method as recited in claim 1, wherein the link is wireless.

6. The method as recited in claim 5, further comprising: facilitating a console for an administrator of a service provider to partition a storage device for creating the storage space according to the predefined capacity for the user of the wireless device, wherein the service provider provides services for the wireless device.

7. The system as recited in claim 2, wherein the operation to the storage space comprises creating from the each of the wireless devices a folder in the storage space.

8. The system as recited in claim 2, wherein the operation to the storage space comprises deleting or moving or copying or renaming, from the each of the wireless devices, a file or a folder being stored in the storage space.

9. The system as recited in claim 2, wherein the link is wireless.

10. The system as recited in claim 9, wherein the server is further configured to facilitate a console for an administrator of a service provider to partition a storage device for creating the storage space according to the predefined capacity for a user of one of the wireless devices, wherein the service provider provides services for the one of the wireless devices.

11. A non-transitory computer-readable storage medium comprising;
computer program instructions that, when executed by a server, configure the server to:
allocate a storage space of a predefined capacity for each of the wireless devices, create a file system for the storage space allocated for the each of the wireless devices;
establish a link for the each of the wireless devices access to the storage space; and
update the file system whenever a user of the each of the wireless devices performs an operation to the storage space, wherein the storage space being remotely located with respect to the each of the wireless devices,
wherein the updating of the file system comprises
updating the file system for storing a file therein, the storing of a file including to download a file from a remote web server, according to download information for the file cached in the each of the wireless devices received therefrom, directly into the storage device allocated thereto when the user via a web browser executed on the each of the wireless devices to perform an operation of downloading the file from the remote web server to the storage space instead of downloading the file into the each of the wireless devices itself.

12. The storage medium of claim 11, wherein the program instructions further configure the server to facilitate a console for an administrator of a service provider to partition a storage device for creating the storage space for a user of one of the wireless devices, wherein the service provider provides services for the one of the wireless devices.

13. The storage medium of claim 11, wherein the operation to the storage space further comprises deleting or moving or copying or renaming, from the each of the wireless devices, a file or a folder being stored in the storage space.

14. The storage medium of claim 11, wherein the operation to the storage space comprise creating from the each of the wireless devices a folder in the storage space.

15. The method as recited in the claim 1, wherein said for the wireless device access to the storage space comprises:
from the wireless device to retrieving a file from the storage device for access to a digital picture, a video, a music or a message being stored therein.

16. The system as recited in the claim 2, wherein said for the wireless device access to the storage space comprises:
from the wireless device to retrieve a file from the storage device for access to a digital picture, a video, a music or a message being stored therein.

17. The storage medium of claim 11, wherein said for the wireless device access to the storage space comprises:
from the wireless device to retrieve a file from the storage device for access to a digital picture, a video, a music or a message being stored therein.

* * * * *

UNITED STATES PATENT AND TRADEMARK OFFICE
CERTIFICATE OF CORRECTION

| | | |
|---|---|---|
| PATENT NO. | : 8,606,880 B2 | |
| APPLICATION NO. | : 10/726897 | |
| DATED | : December 10, 2013 | |
| INVENTOR(S) | : Sheng Tai Ted Tsao | |

It is certified that error appears in the above-identified patent and that said Letters Patent is hereby corrected as shown below:

Delete the title page and substitute therefore with the attached title page showing the corrected number of drawing sheets in patent.

In the Drawings:

FIG. 5 through FIG. 11C have been deleted.

In the Claims:

A) in column 6 line 16, column 6 line 43, column 7 line 36 - column 8 line 1, column 8 lines 22 – 23, column 8 lines 27 – 28, column 8 lines 32 – 33, please replace "storage device" with
---storage space---.

Signed and Sealed this
Twenty-fifth Day of February, 2014

Michelle K. Lee
*Deputy Director of the United States Patent and Trademark Office*

(12) United States Patent
Tsao

(10) Patent No.: US 8,606,880 B2
(45) Date of Patent: Dec. 10, 2013

(54) USE OF WIRELESS DEVICES' EXTERNAL STORAGE

(75) Inventor: Sheng (Ted) Tai Tsao, San Jose, CA (US)

(73) Assignee: Sheng Tai (Ted) Tsao, Fremont, CA (US)

(*) Notice: Subject to any disclaimer, the term of this patent is extended or adjusted under 35 U.S.C. 154(b) by 2766 days.

(21) Appl. No.: 10/726,897

(22) Filed: Dec. 4, 2003

(65) Prior Publication Data
US 2010/0005153 A1    Jan. 7, 2010

(51) Int. Cl.
*G06F 15/16* (2006.01)
(52) U.S. Cl.
USPC ........ 709/219; 709/203; 709/226; 455/412.1; 455/899
(58) Field of Classification Search
USPC .............. 709/200, 203, 217, 219, 226, 245; 455/412.1, 899
See application file for complete search history.

(56) References Cited

U.S. PATENT DOCUMENTS

| | | | |
|---|---|---|---|
| 6,351,776 B1 * | 2/2002 | O'Brien et al. | 709/245 |
| 6,356,941 B1 * | 3/2002 | Cohen | 709/219 |
| 6,714,968 B1 * | 3/2004 | Prust | 709/219 |
| 6,735,623 B1 * | 5/2004 | Prust | 709/219 |
| 6,839,743 B2 * | 1/2005 | Shim | 709/217 |
| 6,985,927 B2 * | 1/2006 | O'Brien et al. | 709/213 |
| 7,506,034 B2 * | 3/2009 | Coates et al. | 709/219 |
| 7,650,621 B2 * | 1/2010 | Thomas et al. | 725/87 |
| 7,894,803 B2 * | 2/2011 | Kamada | 455/414.3 |
| 2002/0059621 A1 * | 5/2002 | Thomas et al. | 725/87 |
| 2002/0123336 A1 * | 9/2002 | Kamada | 455/420 |
| 2002/0128036 A1 * | 9/2002 | Yach et al. | 455/552 |
| 2002/0133597 A1 * | 9/2002 | Jhingan et al. | 709/228 |
| 2003/0191716 A1 * | 10/2003 | Woods et al. | 705/50 |

* cited by examiner

*Primary Examiner* — El Hadji Sall

(57) ABSTRACT

Adapting web-based external storage, wireless device can posses huge amount of storage that current any wireless device's internal storage can not provide. To effectively let the storage server providing external storage (file system) for wireless device, the storage of a storage server need to be partitioned into multiple small storage volume and need to be exported to each specific wireless device. The console support software coupled with web-server software of a server provides both users of wireless device and console through web-browser to perform tasks of creating and utilizing external storage (file system). To support larger number of wireless devices with external storage, a central controlled distributed scalable virtual machine infrastructure can be deployed. The larger number of storage server controlled by a central control system can satisfy unlimited wireless devices external storage needs.

17 Claims, 4 Drawing Sheets

Wireless out-band download